Figure 1:
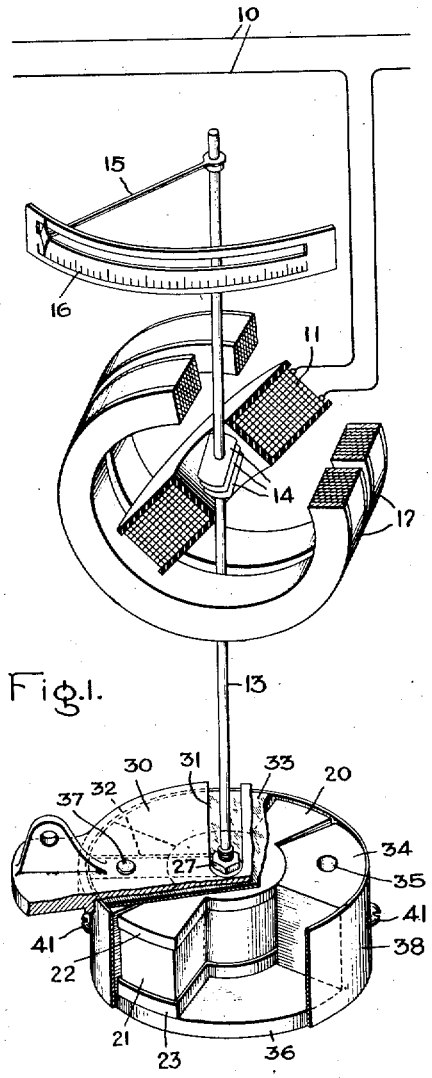
Figure 2:
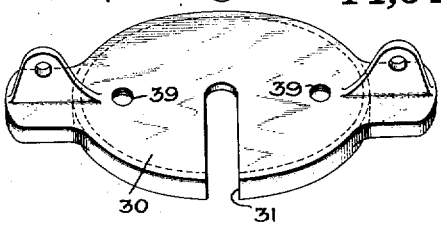
Figure 3:
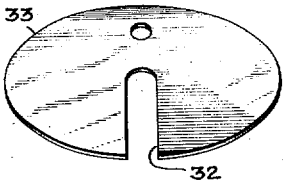
Figure 4:
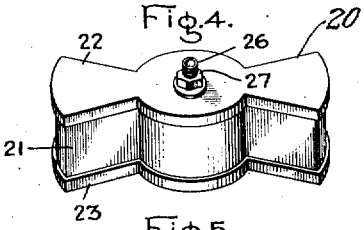

A. O. BENECKE.

DASH POT FOR MEASURING INSTRUMENTS.

APPLICATION FILED SEPT. 23, 1918.

2 SHEETS—SHEET 1.

Reissued Nov. 5, 1918.

14,545.

Inventor:
Adelbert O. Benecke,
by Albert G. Davis
His Attorney.

A. O. BENECKE.

DASH POT FOR MEASURING INSTRUMENT

APPLICATION FILED SEPT. 23, 1918.

Reissued Nov. 5, 1918.

2 SHEETS—SHEET 2.

14,545.

Inventor:
Adelbert O. Benecke,
by Albert G. Davis
His Attorney.

UNITED STATES PATENT OFFICE.

ADELBERT O. BENECKE, OF BOSTON, MASSACHUSETTS, ASSIGNOR TO GENERAL ELECTRIC COMPANY, A CORPORATION OF NEW YORK.

DASH-POT FOR MEASURING INSTRUMENTS.

14,545. Specification of Reissued Letters Patent. Reissued Nov. 5, 1918.

Original No. 1,269,519, dated June 11, 1918, Serial No. 61,508, filed November 15, 1915. Application for reissue filed September 23, 1918. Serial No. 255,664.

*To all whom it may concern*

Be it known that I, ADELBERT O. BENECKE, a citizen of the United States, residing at Boston, county of Suffolk, State of Massachusetts, have invented certain new and useful Improvements in Dash-Pots for Measuring Instruments, of which the following is a specification.

My invention relates to measuring instruments, such for example as electrical measuring instruments, and in particular the invention relates to measuring instruments having damping means for retarding or damping the movement of the movable element of the instrument. A measuring instrument designed to indicate the instantaneous value of a varying or fluctuating quantity or characteristic usually has a movable element responsive to changes in the quantity or characteristic to be measured, and this movable element is generally provided with some sort of damping means for retarding or damping its movement. If a measuring instrument of this type has no damping means, a sudden change in the quantity or characteristic to be measured will impart such a large moving tendency to the movable element that the momentum of the element will carry it beyond the point of equilibrium where it should come to rest to properly indicate the changed value of the quantity or characteristic. The result is that the indicating member of the instrument swings back and forth in an oscillatory manner and only very slowly reaches a state of equilibrium or rest. It usually is desirable that the movable element have a dead-beat action, or in other words that its movement be free from oscillations, so that the indicating member will come to rest without overshooting the point of equilibrium, and hence will accurately follow all ordinary variations in the quantity or characteristic to be measured. Measuring instruments of this character are, accordingly, generally provided with a damping device for the purpose of effecting a dead-beat action of the indicating member, such as an index needle or pointer, so as to give practically instantaneous indications of the quantity or characteristic to be measured. The object of my invention is generally to improve the construction of measuring instruments provided with damping means for the movable element, and more particularly the object of my invention is to provide a novel and improved construction of air damping device for the movable element of a measuring instrument. Other objects of the invention will be brought out in the course of the following description.

In a great many measuring instruments the motion of the movable element is a rotary one and my present invention applies particularly to an air damping device for such instruments. I have, accordingly, described the invention in a form applicable to instruments with rotary moving elements, although it will be well understood that the invention is equally applicable to instruments in which the motion of the movable element is in a straight line, or in any characteristic curve.

The simplest air damping device for instruments with rotatable moving elements consists of a light vane suitably connected to the shaft of the instrument and preferably moving in an air chamber. In order to make the damping more effective it is customary to provide two such vanes arranged on diametrically opposite sides of the axis of the moving element of the instrument. Again, the edges of such an air damping vane may be turned over to provide longer air passage ways for the passage of air between the two compartments formed in the air chamber by the vanes. While such a device is effective, it has, together with all similar devices with which I am acquainted, the defect that the vane must be handled with extreme care in assembling, so as not to be bent in the least, as otherwise it would cause friction by touching the walls of the air chamber. This defect is so serious that it has been the cause of substituting for the simple air damper more complicated, more expensive and less effective damping means, as for example, magnetic damping.

Where an air damping vane swinging in a chamber has heretofore been used, it has always been necessary to have an arm extending through a slot in the wall of the air chamber in order to connect the air vane to the movable shaft of the instrument. Such a slot has always been recognized as a weak feature, because the slot naturally makes an opening in the chamber which it is difficult to properly close. My present invention aims to provide a construction for eliminating this objectionable feature, and to this end the air damper of my invention is directly mounted on the movable shaft without the intervention of the usual arm and slot of the air damping devices of the prior art.

My present invention consists in the construction of a very light and very rigid air damper and in the construction of an air chamber for the same in such a manner that the adjustment of the position of the damper inside the air chamber can be accurately and easily accomplished. The air damper of my present invention comprises a hollow box-like member which is completely closed on all sides and moves in a closed air chamber whose dimensions are such that relatively long narrow air passages are provided between the walls of the chamber and the hollow damper. This damper is adapted for instruments whose moving elements are balanced or nearly balanced, and also for instruments whose moving elements require balancing by counter-weights. Where the moving element is substantially balanced the air damper will be symmetrically positioned with respect to the axis of the shaft of the element, while in the other case where the moving element requires balancing by counter-weights the damper may be unsymmetrically positioned with respect to the axis of the shaft of the moving element.

The novel features which I believe to be patentably characteristic of my invention are definitely pointed out in the claims appended hereto. The practical application of my novel and improved damping device to an electrical measuring instrument will be better understood from the following description taken in connection with the accompanying drawings in which;

Figure 1 is a diagrammatic view in perspective of my invention applied to an ammeter, Figs. 2, 3, 4, 5, 6 and 7 are detail views illustrating the construction of the damping device shown in Fig. 1; and Figs. 8, 9, 10, 11 and 12 are detail views illustrating a modified construction of the damping device.

In Fig. 1 of the drawings I have illustrated an electric current measuring instrument or ammeter of the inclined coil type adapted to measure the flow of electric current in an electric circuit 10. The instrument comprises a stationary current carrying coil 11 and stationary shields 12 of laminated magnetic material. The moving element consists of a pivotally mounted shaft 13 to which are secured a plurality of magnetic vanes 14 positioned within the magnetic influence of the coil 11, and an index needle or pointer 15 adapted to sweep across a suitable scale 16.

The damping device is operatively positioned at the lower end of the shaft 13. The damping device comprises a hollow box-like damper 20 secured to the shaft 13 and movably positioned in a closed air chamber. The damper 20 consists of a shell or side wall 21 formed of a continuous strip of thin sheet metal and sheet metal top and bottom members 22 and 23, respectively. The shell 21 is preferably formed of a thin seamless aluminum ring of about 0.003 to 0.005 of an inch in thickness. The aluminum ring is suitably shaped, as for example by die-stamping, to give it the 8-shaped configuration shown in Figs. 1 and 4 of the drawings. The top and bottom members 22 and 23 are similarly formed of thin sheet aluminum and are drawn up with narrow flanges which fit over the shell 21. This flanged construction of the top and bottom members will be readily understood from an inspection of Figs. 4 and 7 of the drawings. A hollow sleeve 25 is positioned within the damper 20 and serves both to properly space the top and bottom members 22 and 23 and to impart additional rigidity to the structure. A second hollow sleeve 26 passes through the sleeve 25 and is provided at one end with a flange which engages the outer surface of the bottom plate 23 and at the other end is screw-threaded for the engagement of a nut 27. The nut 27 and sleeve 26 serve to firmly secure the parts of the damper together as a rigid unitary structure. It will thus be observed that the damper is a box-like structure closed on all sides. Its construction of thin sheet aluminum makes it very light and the box-like construction insures the necessary rigidity which is essential in dampers of this character.

The shaft 13 of the moving element extends through the sleeve 26 and the damper is secured to the shaft in any suitable manner, as for example by a pin 42 extending through the sleeve 26 and shaft 13. It will of course be understood that the sleeve 26 could be mounted on the shaft 13 by a force-fit, and held in position by shellac, collodion, or the like. A supporting plate 30 is suitably secured within the instrument and serves to hold the elements forming the air chamber for the damper 20. The supporting member 30 has a slot 31 which is designed to register with a slot 32 in a supplementary cover 33. In assembling the apparatus the slots 31 and 32 coincide and the shaft 13 can then be brought to the inner end of the registering slots, whereupon the supplementary top 33 is turned through an angle of 90 degress, so that the slot 31 is covered, but a circular hole is left in the center for the shaft. Two spacing blocks 34 having apertures 35 therein are secured to the circular base plate 36. The base plate 36 and spacing blocks are secured to the supporting member 30 by screws 37, which extend through the apertures 35 in the spacing blocks and engage in screw-threaded holes 39 in the supporting member 30. The position of the damper 20 in the air chamber can be adjusted by adjusting the lower jewel screw, as will be more fully described in the following paragraph. A ring 38 slips over the base plate 36 and is secured to the spacing blocks 34 by screws 41, thus closing the sides of the air chamber. It will be observed that the damper 20 is symmetrically positioned with respect to the axis of the shaft 13 and that the spacing blocks 34 are positioned diametrically opposite with respect to the same axis. Two air chambers are thus provided for the symmetrical portions of the damper.

Figure 5:
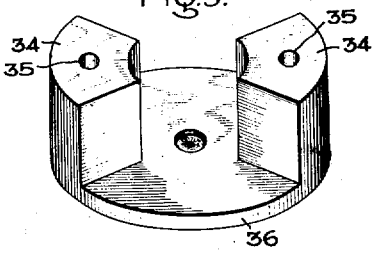
Figure 6:
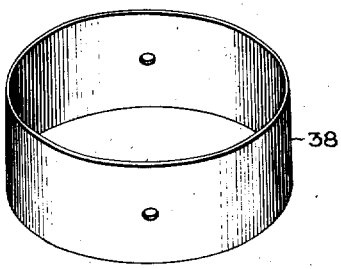
Figure 7:
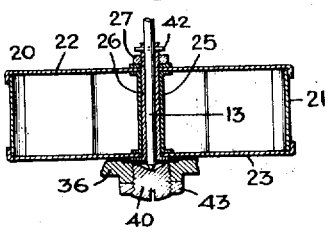
Figure 8:
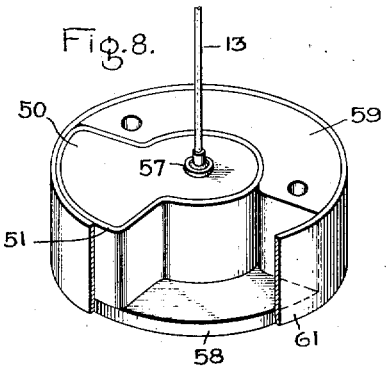
Figure 9:
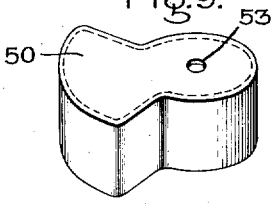
Figure 10:
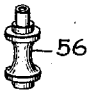
Figure 11:
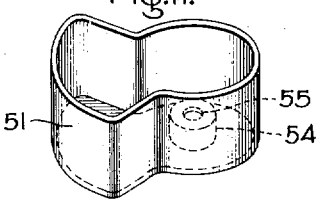
Figure 12:
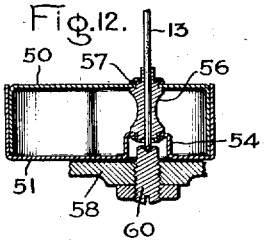

The lower jewel screw 40 for the shaft 13 of the moving element engages a screw-threaded hole in the base plate 36. Reference to Figs. 5 and 7 of the drawings will show how the jewel screw is mounted in the base plate and secured in its adjusted position by a lock-nut 43. The jewel screw can, accordingly, be adjusted so that the damper 20 swings freely with equal clearance between the base plate 36 and the supplemental cover 33. Before the ring 38 is assembled the position of the damper in the air chamber can be clearly observed, as will be evident from Fig. 1 of the drawings, where the ring has been partly broken away. By adjusting the lower jewel screw the clearance between the damper and the top and bottom walls of the air chamber can be very accurately adjusted, and the ring 38 can then be assembled without in any way affecting the adjustment of the damper. This construction provides a very simple, convenient and effective means for adjusting the damper.

The construction of the damper of the damping device of my present invention is such that the air has to pass through very long passages when flowing between the compartments formed in the air chamber by the damper, which results in a very effective damping, even with considerable clearance between the vane and air chamber. If a sudden and abnormally large change takes place in the quantity to be measured the movement of the moving element comes almost to a stop and continues slowly, so that if an overload occurs the pointer of the instrument will not be damaged by striking a stop. The damper is very light and very rigid, and can be handled in assembling without any danger of being bent or distorted. The construction of the air chamber in accordance with my present invention permits inspection and an adjustment of the damper inside of the air chamber.

The air damper for instruments having unbalanced moving elements is one-sided or unsymmetrical, so that the damper also forms a counter-weight for the unbalanced movement of the instrument. An air damper for this type of instrument is illustrated in Figs. 8, 9, 10, 11 and 12 of the drawings. I have shown in these figures a slightly modified mechanical construction of the box-like air damper, in that the damper is made up of only two parts or members 50 and 51. These members are stamped or punched from a suitable piece of sheet metal, such for example, as sheet aluminum 0.003 of an inch thick. Each member has a flat top or bottom part, as the case may be, of a fan-shaped configuration, and a continuous side member or flange extending from the periphery of the flat part. The top member 50 has a hole 53, while the bottom member 51 has a cup-shaped depression 54 having a centrally positioned hole 55 directly beneath the hole 53. In assembling the air damper the two members 50 and 51 are telescoped with a hub 56 therebetween. The hub 56 has a shoulder at each end, and the holes 53 and 55 engage thereon, as clearly shown in Fig. 12 of the drawings. The hub serves to properly space the two members 50 and 51 and also adds to the rigidity of the damper construction. Washers 57 are mounted on the hub adjacent the exterior top and bottom surfaces of the air damper, and the parts are firmly secured or riveted together by turning the edges of the shoulders of the hub 56 over the washers 57, as clearly indicated in Fig. 12 of the drawings. The hub 56 is made to have a driving-fit on the shaft 13 of the instrument, and is further preferably cemented to the shaft to insure its secure engagement therewith. A one-compartment air chamber is adapted to be formed by a circular base 58 having a block 59 secured thereto or integral therewith. The base 58 and block 59 are adapted to be fastened to a cover member in the same manner as described with reference to the base 36. A jewel screw 60 is mounted in the base 58 and may be adjusted to properly position the air damper in the damping chamber as hereinbefore described. When the position of the air damper has been properly adjusted, the parts are inclosed by a ring 61, in every way analogous to the ring 38 shown in Fig. 6.

I have herein shown and particularly described certain embodiments of my invention for the purpose of explaining its principle and showing its application, but numerous modifications of the details of construction of these embodiments and other applications will present themselves to those skilled in the art. I, therefore, wish to cover by the following claims all modifications within the spirit of the invention.

What I claim as new and desire to secure by Letters Patent of the United States, is,—

1. A measuring instrument having in combination a movable element and an air damping device comprising a hollow box-like damper secured to said element and movably positioned in a substantially closed air chamber.

2. A measuring instrument having in combination a movable element, an air damping device comprising an inclosed hollow structure secured to said element, and means forming an inclosed air chamber in which said structure is adapted to move.

3. A measuring instrument having in combination a movable element and an air damping device comprising a hollow box-like damper secured to said element, and means forming an inclosed air chamber in which said damper is adapted to move, the dimensions of said damper and its clearance in said air chamber being such that relatively long narrow air passages are provided for the passage of air between the compartments formed in said air chamber by said damper.

4. A measuring instrument having in combination a movable element and an air damping device comprising a hollow box-like damper symmetrically positioned with respect to the axis of said element and secured to the element, and means forming two air chambers in each of which is movably positioned a symmetrical portion of said damper, the dimensions of said damper and its clearance in said air chambers being such that relatively long narrow air passages are provided for the passage of air between the two compartments formed in each air chamber by the symmetrical portions of said damper.

5. A measuring instrument having in combination a movable element and an air damping device comprising a hollow box-like damper having a wall formed of a continuous strip of sheet metal and sheet metal top and bottom members, means rigidly holding the members of said damper together and to said movable element, and means forming an inclosed air chamber in which said damper is adapted to move.

6. A measuring instrument having in combination a movable element and an air damping device comprising a hollow box-like damper symmetrically positioned with respect to the axis of said element and consisting of a substantially 8-shaped wall formed of a continuous strip of sheet metal and sheet metal top and bottom members, a hollow sleeve secured to said element and positioned within said damper and adapted to serve as a spacing means for said top and bottom members, and means forming two substantially closed air chambers in each of which is movably positioned a symmetrical portion of said damper, the dimensions of said damper and its clearance in said air chamber being such that relatively long narrow air passages are provided for the passage of air between the two compartments formed in each air chamber by the symmetrical portions of said damper.

7. A measuring instrument having in combination a movable element and an air damping device comprising a hollow box-like damper symmetrically positioned with respect to the axis of said element and secured to the element, and a base plate having two spacing blocks oppositely positioned with respect to the axis of said element coöperating with independent top and side members for forming two air chambers in each of which is movably positioned a symmetrical portion of said damper, the dimensions of said damper and its clearance in said air chamber being such that relatively long narrow air passages are provided for the passage of air between the two compartments formed in each air chamber by the symmetrical portions of said damper.

8. A measuring instrument having in combination a movable element and an air damper consisting of a hollow box-like structure secured to the movable element.

9. A measuring instrument having in combination a movable element and an air damper secured thereto and consisting of a side wall and top and bottom members of sheet metal secured together to form a substantially closed hollow structure.

10. A measuring instrument having in combination a movable element and an air damper secured thereto and consisting of a side wall of sheet metal, and sheet metal top and bottom members spaced apart by a hollow sleeve and coöperating with said side wall to form a substantially closed hollow structure, said movable element having a shaft extending through said hollow sleeve and secured thereto.

11. A measuring instrument having in combination a movable element and an air damping device comprising a damper, a circular base plate having spacing means cooperating with a cylindrical side wall and a circular top member for forming a substantially closed air chamber in which said damper is adapted to move.

12. A measuring instrument having in combination a movable element and an air damping device comprising a damper, a supporting member having a slot therein, a closing member adjacent said supporting member and having a slot therein adapted to register with the slot in said supporting member and adapted to be turned so that said slots are out of registry whereby a centrally positioned hole is formed through which the shaft of said movable element extends, two spacing blocks oppositely positioned with respect to the axis of said element, and means securing said members and blocks together and forming two substantially closed air chambers in which said damper is adapted to move.

13. A measuring instrument comprising in combination a movable element, a hollow box-like air damper secured to said element, means forming a closed air chamber in which said damper is adapted to move, and means for adjusting the clearance of said damper between the top and bottom of the air chamber.

14. A measuring instrument comprising in combination a movable element having a pivotally mounted shaft, an air damper secured to said shaft, means including a base member forming a closed air chamber in which said damper is adapted to move, and a jewel screw for said shaft adjustably mounted in said base member whereby the clearance of the damper between the top and bottom of the air chamber can be adjusted.

In witness whereof, I have hereunto set my hand this twelfth day of November, 1915.

ADELBERT O. BENECKE.